June 2, 1942. J. F. JOY 2,284,661
MATERIAL TRANSPORT TRUCK
Filed Dec. 21, 1938 4 Sheets-Sheet 1
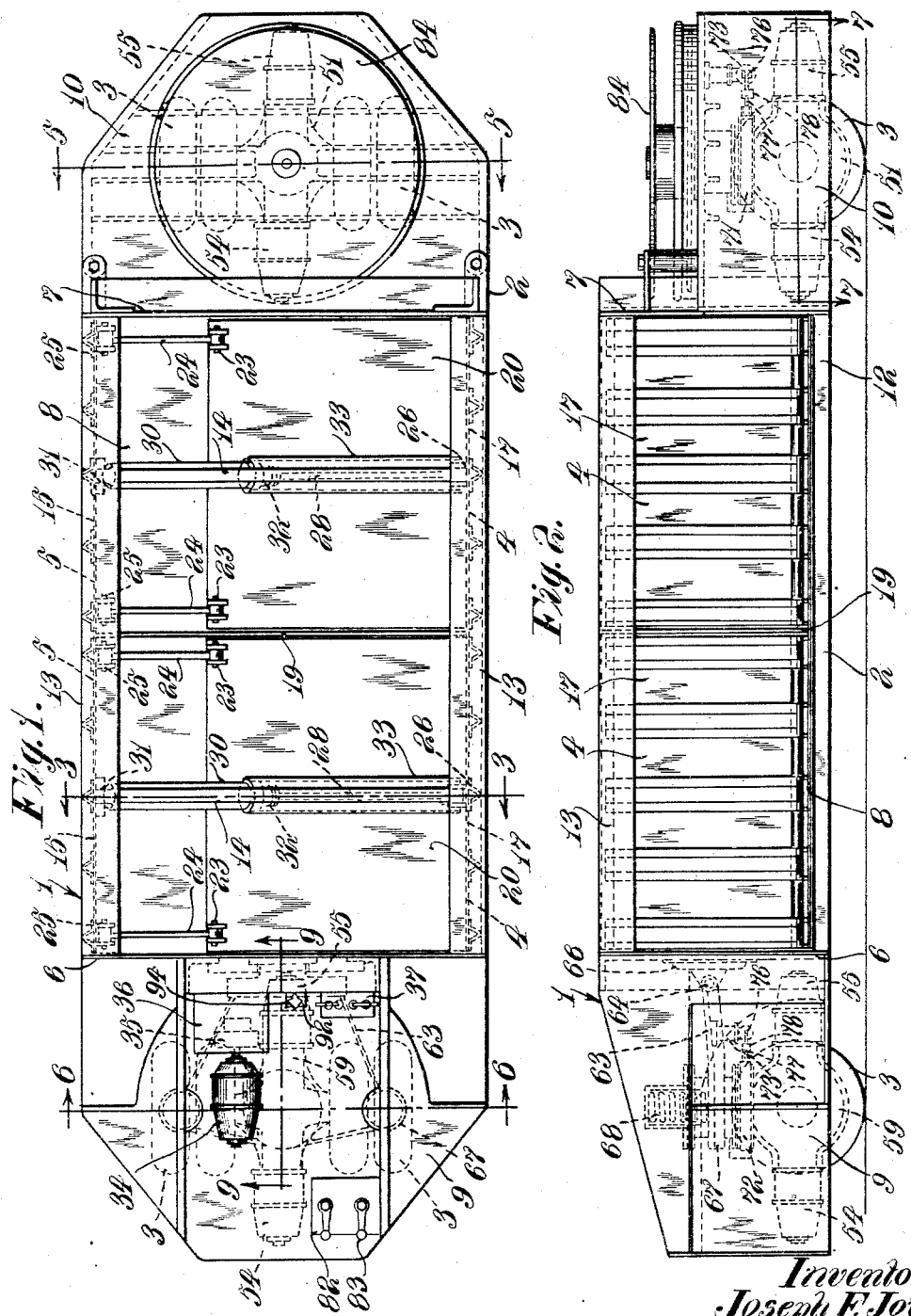
Inventor:
Joseph F. Joy.
by Lewis A. Maxim.
Atty.

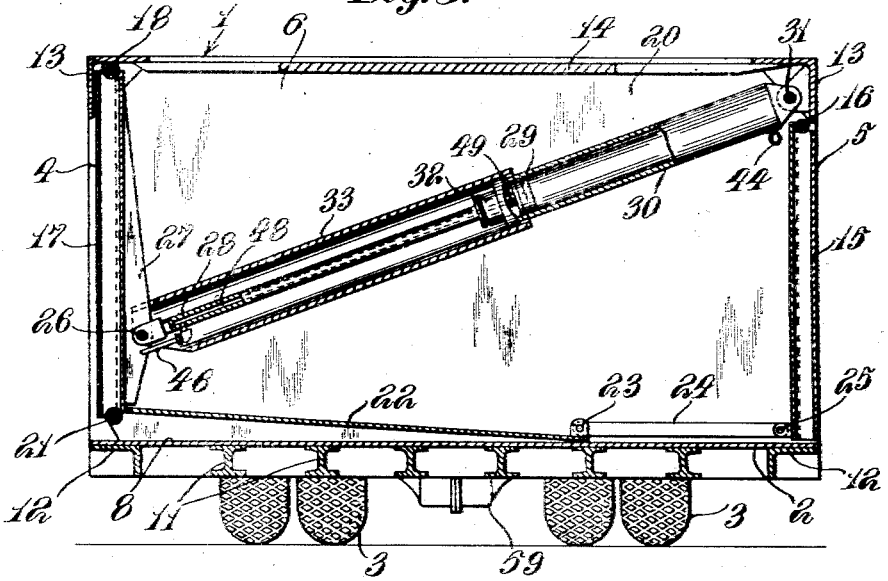
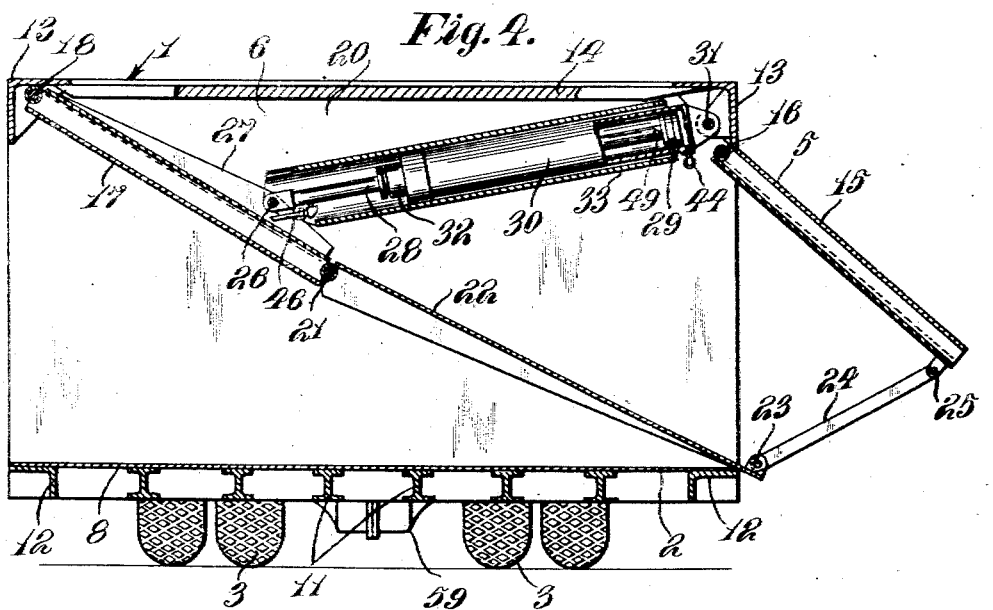

June 2, 1942. J. F. JOY 2,284,661
MATERIAL TRANSPORT TRUCK
Filed Dec. 21, 1938 4 Sheets-Sheet 3
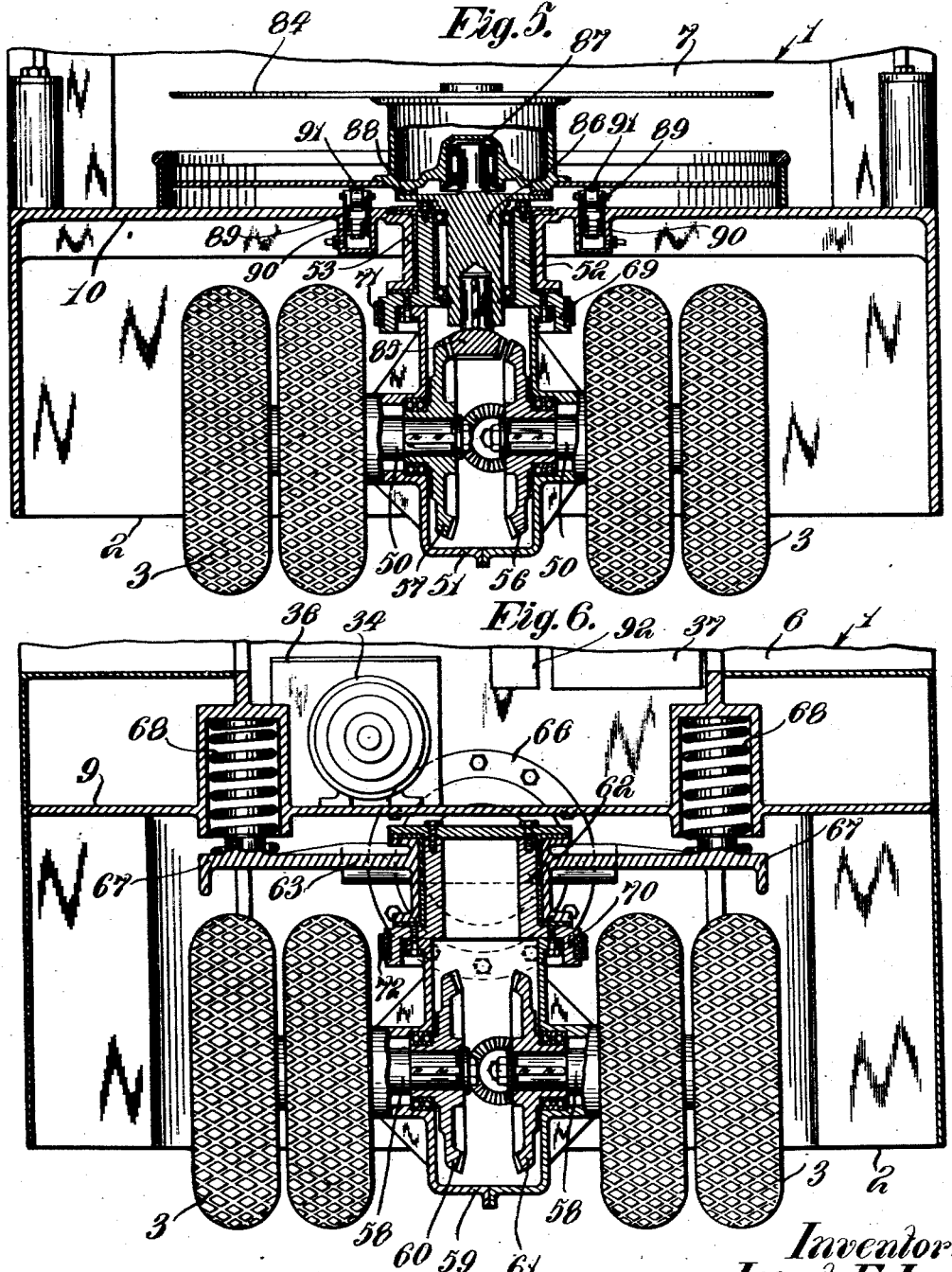
Inventor:
Joseph F. Joy.
by
Louis A. Maxson.
Atty.

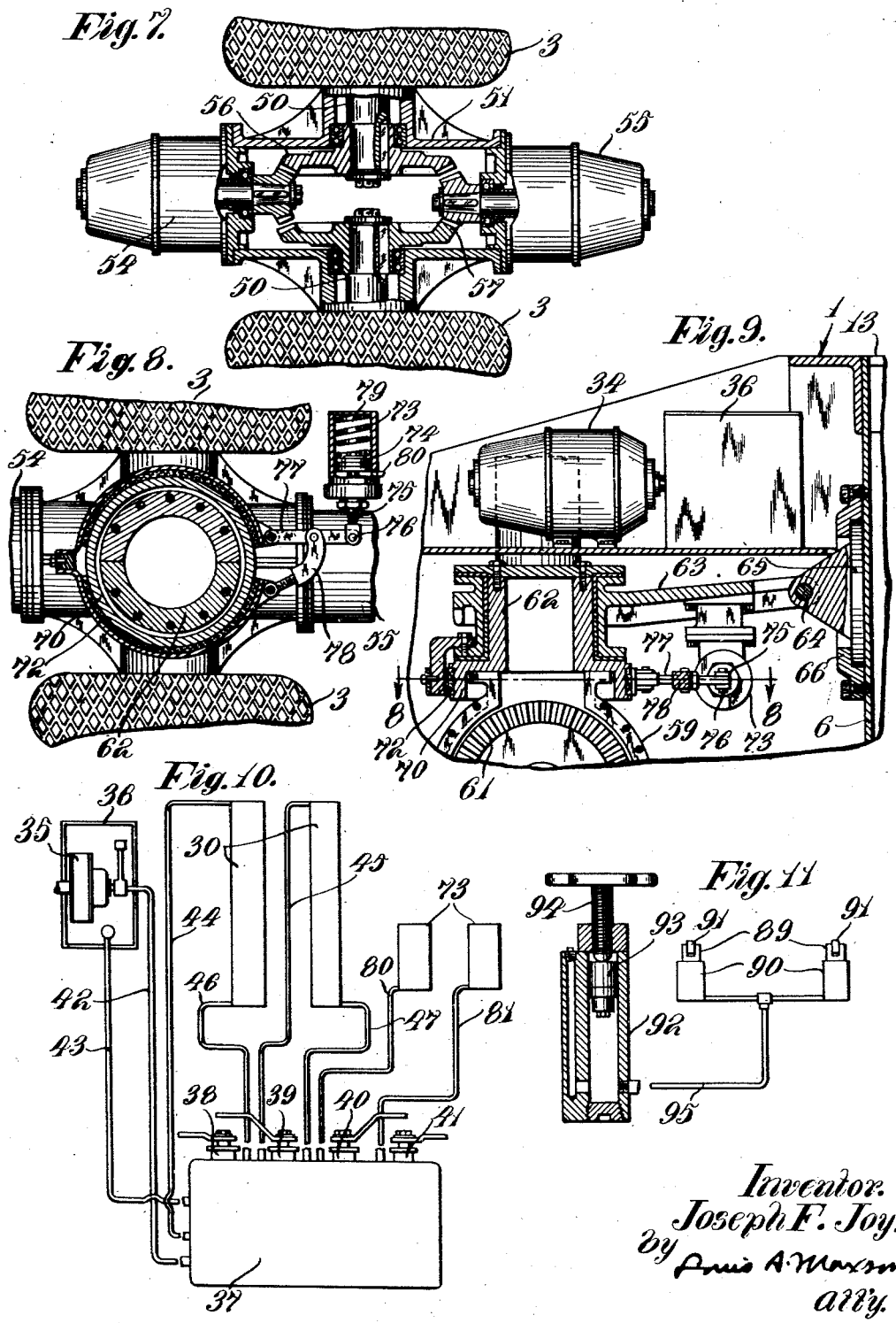

Patented June 2, 1942

2,284,661

UNITED STATES PATENT OFFICE 2,284,661

MATERIAL TRANSPORT TRUCK

Joseph F. Joy, Pittsburgh, Pa., assignor to Sullivan Machinery Company, a corporation of Massachusetts Application December 21, 1938, Serial No. 246,961

14 Claims. (Cl. 214—82)

This invention relates to material transport trucks, and more particularly, but not exclusively, to an improved transport truck of the wheel mounted, rubber tired type especially designed for use in trackless mines.

An object of this invention is to provide an improved material transport truck. Another object is to provide an improved material transport truck of the wheel mounted, rubber tired type especially designed for use in trackless mines. A further object is to provide an improved material transport truck having improved means for effecting discharge of the material from the truck while maintaining the overall height of the truck at a minimum, whereby the truck may operate in mines having relatively low head room. Still another object is to provide an improved material discharge means for a transport truck whereby the material may be discharged laterally from one side of the truck without tilting the truck body as a whole or increasing the overall height of the truck during discharging of the material. A still further object is to provide an improved transport truck having improved propelling means and improved means for steering the truck, whereby the truck may easily negotiate the relatively sharply curved passages in a mine. This improvement forms the subject matter of a divisional application. Another object is to provide an improved material transport truck especially designed for use in trackless mines whereby a relatively large quantity of material may be transported from place to place in the mine while the overall height of the truck is maintained at a minimum. A still further object is to provide an improved transport truck having improved power-operated means for effecting discharge of material from the truck, the discharge means preferably being hydraulically operated. Another object is to provide an improved transport truck wherein the material may be automatically discharged laterally from one side of the truck without necessitating tilting of the truck body as a whole. A further object is to provide an improved material transport truck of relatively large capacity for transporting the material from the working face of a mine, the truck being of relatively low overall height and mounted on rubber tired wheels adapted to run directly on the mine floor, thereby eliminating the necessity of a mine trackway. Other objects and advantages of the invention will, however, hereinafter more fully appear.

In the accompanying drawings there is shown for purposes of illustration one form which the invention may assume in practice.

In these drawings—

Fig. 1 is a top plan view of an illustrative form of the improved transport truck.

Fig. 2 is a side elevational view of the truck shown in Fig. 1.

Fig. 3 is an enlarged cross sectional view taken substantially on line 3—3 of Fig. 1.

Fig. 4 is a view similar to Fig. 3, showing the parts of the material discharge means in their material-discharging position.

Fig. 5 is an enlarged cross sectional view taken substantially on line 5—5 of Fig. 1.

Fig. 6 is an enlarged cross sectional view taken substantially on line 6—6 of Fig. 1.

Fig. 7 is an enlarged horizontal detail sectional view taken substantially on line 7—7 of Fig. 2.

Fig. 8 is a detail horizontal sectional view taken on line 8—8 of Fig. 9.

Fig. 9 is an enlarged, longitudinally extending, vertical sectional view taken substantially on line 9—9 of Fig. 1.

Fig. 10 is a diagrammatic view illustrating the hydraulic fluid system.

Fig. 11 is a diagrammatic view illustrating the hydraulic control means for the electric cable reel.

In this illustrative embodiment of the invention, there is shown a material transport truck, or so-called coal buggy, generally designated 1, herein of the wheel mounted, rubber tired type especially designed for use in trackless coal mines and comprising a mine-car type truck body 2 mounted on transport wheels 3, the latter having pneumatic rubber tires of the conventional automotive type. The truck body is relatively low in height and generally rectangular in shape and has vertical side walls 4 and 5, vertical end walls 6 and 7 and a flat horizontal bottom 8. The end walls are suitably rigidly secured to end frames 9 and 10, and extending longitudinally between these end frames and rigidly secured thereto are bottom frame members 11 and 12 for connecting the end frames and bracing the bottom plate 8. Also extending longitudinally of the truck at the opposite sides thereof near its top and rigidly secured in a suitable manner at their extremities to the upper portions of the vertical end plates 6 and 7, are rigid frame members 13, 13 herein in the form of angle irons. The side frame members 13, 13 are laterally braced by transversely extending top frame members 14 in the form of narrow cross bars secured at their extremities to the side frame members. The side wall 5 consists of a pair of identical side frame or wall sections 15, 15, each pivotally mounted at 16, at its upper edge, on a bracket supported by the adjacent frame member 13. The side wall 6 likewise consists of two identical side frame or wall sections 17, 17, each pivotally mounted at its upper end at 18 on a bracket secured to the other frame member 13. The wall sections 15, 15 are swingable about their pivots outwardly from one side of the truck body, while the wall sections 17, 17 are swingable about their pivots inwardly relative to the other side of the truck body, the sections 17, 17 swinging within the truck body, as shown in Fig. 4. Extending transversely of the truck body midway between the end walls of the latter and interposed between the adjacent ends of the side frame sections 15, 15 and 17, 17 is a vertical plate 19 providing a partition which separates the truck body into two material-receiving compartments 20, 20, the vertical plate 19 being rigidly secured to the bottom plate 8 and the side frame members 13, 13 in any suitable manner. Each of the side frame sections 17 is pivotally connected at 21, on a pivotal axis parallel to the pivotal axis 18, to a bottom plate section 22. These bottom plate sections overlie the compartment bottoms and have depending upright flanges adapted to rest at their lower edges on the bottom plate 8 when the parts are in the position shown in Fig. 3 with the outer ends of the sections 22, remote from their pivots 21, engaging the top surface of the bottom plate 8 in the manner shown. The bottom plate sections 22 are pivotally connected at 23 to links 24 in turn pivotally connected at 25 to the side plate sections 15 near the bottom edges of the latter.

Now referring to the improved power-operated means for adjusting the frame sections 15, 17 and 22 relative to the truck body to effect discharge of the material from the compartments 20, 20, it will be noted that pivotally connected at 26 to vertical ribs 27 integral with the frame sections 17 are piston rods 28 having pistons 29 secured thereto, the latter being reciprocably mounted in hydraulic cylinders 30. One cylinder is arranged in each material-receiving compartment 20 and extends transversely of the latter in the manner shown. These hydraulic cylinders are pivotally mounted at 31, at their upper ends, on brackets secured to the adjacent side frame member 13. The piston rods 28 extend outwardly through the inner packed heads 32 of the cylinders. It will thus be seen that when liquid under pressure is supplied to the inner ends of the cylinders 30 at the inner sides of the pistons 29, the latter are moved upwardly within the cylinder bores to effect swinging of the frame sections 15, 17 and 22 from the position shown in Fig. 3 to the material-discharging position shown in Fig. 4. When liquid under pressure is supplied to the opposite ends of the cylinders 30, the pistons may be moved in the opposite direction to effect return of the frame parts 15, 17 and 22 to their initial position shown in Fig. 3. Surrounding each of the piston rods and cylinders is a tubular housing or guard 33 for protecting the cylinder parts from contact with the material received in the compartments 20, 20. When the frame parts 15, 17 and 22 are in their material-discharging position shown in Fig. 4, the frame sections 15 are in an outwardly-swung position relative to the side of the truck body, while the frame sections 17 and 22 cooperate to provide a chute over which the material discharges in a lateral direction from the truck body compartments, the parts swinging into the position shown in Fig. 4 during discharge of the material without tilting of the truck body as a whole or increasing the overall height of the truck.

The means for supplying liquid under pressure to the cylinders 30 comprises a motor 34 mounted on the end frame sections 9 at the forward end of the truck, and this motor has its power shaft connected to a conventional liquid pump 35 contained within a liquid tank 36. Mounted on the end frame 9 is a valve box 37 having valve bores containing valves 38, 39, 40 and 41 of a conventional design. This valve box has usual intake and discharge passages connected through supply and discharge conduits 42 and 43 to the pump discharge and liquid tank respectively. The valve box bores containing the valves 38 and 39 are respectively connected by conduits 44 and 45 to the upper ends of the cylinders 30, while the lower ends of these cylinders are connected through conduits 46 and 47 to the valve bores respectively. By the provision of independent valves for the cylinders 30, 30, the material in the compartments 20, 20 may be either independently or simultaneously discharged as desired. The conduits 46 and 47 are connected to the cylinder bores through passages 48 formed in the piston rods 28 and communicating through ports 49 with the lower ends of the cylinder bores. The conduits 44, 45, 46 and 47 may have flexible portions, thereby to enable free swinging of the cylinders and piston rods about their axes of pivotal connection with the truck body and side frame sections during operation of the material discharging means without interrupting fluid supply and discharge with respect to the cylinders. The valves 40 and 41 control the brake devices of the steering mechanism, as will later be explained.

In this illustrative construction, the rear truck wheels 3 are secured to alined axles 50, 50, respectively, herein suitably journaled within an axle housing 51. This housing is secured to an upstanding cylindric support 52 journaled for rotation on a vertical axis in bearing sleeves supported by a bearing support 53 formed integral with the end frame 10. Also mounted on the housing 51 are motors 54 and 55, herein preferably of the reversible electric type, having their power shafts respectively connected through bevel gearing 56, 57 to the truck wheel axles 50, 50, respectively, whereby the rear truck wheels may be independently driven. The front truck wheels 3 are secured to alined axles 58, respectively, herein suitably journaled in an axle housing 59. Mounted on the housing 59 are motors, similar to the motors 54 and 55, having their power shafts connected through bevel gears to bevel gears 60 and 61, respectively secured to the axles 58. The front axle housing 59 is secured to an upstanding cylindric member 62 journaled for rotation on an upright axis in bearing sleeves supported by a frame 63. As shown in Fig. 9, this frame 63 is pivotally connected at 64, for vertical swinging movement, on a transverse axis to a circular plate 65 in turn mounted in a bearing annulus 66 for rotative movement about a horizontal axis extending longitudinally of the truck. The pivotal axes are arranged in right angular relation, thereby to provide a universal pivotal mounting for the front housing 59, thereby to enable the truck wheels to move over an uneven floor without substantial tilting of the truck body. The pivoted frame 63 has lateral arms 67, and interposed between the front frame 9 and these arms are coil springs 68, these springs providing a yieldable shock absorbing connection between the axle housing and the truck body. Secured to the swivelled axle housings 51 and 59 respectively are brake drums 69 and 70 with which brake bands 71 and 72 respectively cooperate. These brake bands when applied hold the axle frames 51 and 59 against swivelling movement on their upright axes relative to the truck body, and when either brake band is released one or the other of the housings 51, 59 may swing on its bearing about its upright axis to enable steering of the truck as it moves over the mine floor. Steering may be effected by independently or simultaneously driving the wheel driving motors in a manner simulating a tractor-tread drive, whereby the wheels may be operated to effect steering of the truck through the drive thereof. The operating means for the brake bands 71, 72 each comprises a cylinder 73 containing a reciprocable piston 74. The front brake cylinder is mounted on the frame 63 while the rear brake cylinder is mounted on the frame 10. Each piston has its piston rod 75 pivotally connected at 76 to a brake band operating link 77. The link 77 of each brake is pivotally connected at one end to the brake band, while the other end of the brake band is connected by a link 78 to the link 77 so that when the pistons 74 are moved inwardly in their cylinders against the action of coil springs 79, the brake bands may be applied through the links 77, 78. The means for operating the brake band controlling pistons 74 comprises conduits 80 and 81 extending from the bores of the valves 40 and 41 respectively to the inner ends of the brake operating cylinders 73. When the conduits 80, 81 are connected to the discharge passage of the valve box, the liquid within the cylinders 73 is released so that at that time the springs 79 act on the pistons to move the latter to effect brake release. From the foregoing, it is evident that either axle housing may be locked against swivelling movement with respect to the truck frame while the other axle housing may swing about its swivel mounting to effect steering of the truck, and, at certain times, both brakes may be released either wholly or partially to permit controlled swivelling of both axle housings, thereby to enable the truck to negotiate a relatively sharply curved mine passage. The motors driving the truck wheels, one individual to each wheel, are of the variable speed type and are controlled through a control box 82 mounted on the front frame member 9 in the manner shown in Fig. 1, and suitable control handles 83 are provided for independently controlling the wheel driving motors.

In this instance, mounted coaxially with the pivotal mounting for the rear axle housing 51 is an electric cable reel 84 on which is wound the power conductor cable for the several motors and arranged in a low compact horizontal position below the top of the truck body. This cable reel may be driven in cable winding direction through a bevel gear 85 meshing with and driven by a bevel gear of the truck wheel driving means. As shown in Fig. 5, this bevel gear has a vertical stub shaft keyed to a vertical shaft 86 suitably journaled within the circular bearing support 52, and this shaft has an upstanding reduced portion 87 on which the cable reel is journaled. The cable reel may be driven by the shaft 86 through a friction ring 88. Hydraulically operated means are provided for elevating the reel 84 to interrupt its drive through the friction ring 88, comprising pistons 89 contained in vertical cylinders 90. The pistons have rollers 91 engaging the bottom plane surface of the cable reel, so that when liquid under pressure is supplied to the lower sides of the pistons the reel may be elevated axially to release its drive through the friction ring. When the cable reel is released from its drive, the cable thereon may be freely unwound from the reel, and when the reel is lowered by the pistons 89 into contact with the friction drive ring 88, the reel may be driven by the shaft 86 in a cable winding direction. The means for supplying liquid under pressure to the cylinders 90 comprises a cylinder block 92 mounted on the end frame 9 in adjacency to the valve box 37, as shown in Fig. 1. As shown in Fig. 11, contained in the cylinder block 92 is a plunger 93 operated by a hand screw 94. The lower end of the cylinder bore is connected through a conduit 95 to the lower ends of the cylinders 90 so that when the plunger 93 is moved downwardly by the hand screw 94 liquid under pressure is forced through the conduit 95 to the cylinders 90 at the lower sides of the pistons 89, thereby to raise the latter upwardly bodily to elevate the cable reel to disconnect its drive through the friction ring 88. By trapping the liquid within the cylinders 90, the cable reel may be held in its elevated released position.

The mode of use of the improved transport truck will be clearly apparent from the description given. When the truck is located at the working face of the coal mine, the compartments 20, 20 of the truck body may be filled with the coal dislodged from the coal face in any suitable manner, and when the truck is filled for transport, the driving motors for the front and rear wheels 3 may be simultaneously driven to effect propulsion of the truck about the mine. Steering of the truck may be effected by interrupting drive through one or the other of the wheel driving motors under the control of the control apparatus 82, 83. During the steering operation one or the other of the axle housings may be held against swivelling movement by application of one or the other of the brake bands 71, 72. When the transport truck reaches its destination, the coal contained in the truck body compartments 20, 20 may be discharged laterally from the side of the truck by supplying liquid under pressure under the control of the valves 38, 39 to the inner ends of the cylinders 30, thereby to effect swinging of the frame sections 15, 17 and 22 from the position shown in Fig. 3 into their coal-discharging position shown in Fig. 4. When the parts are moved toward the position shown in Fig. 4, the coal contained in the truck body compartments is initially forced laterally from the open side of the truck body and when the frame sections 17 and 22 approach the inclined position shown in Fig. 4, the coal slides laterally from the side of the truck body by gravity, the frame sections 17 and 22 at that time acting as a chute. When the coal is completely discharged from the truck body compartments, liquid under pressure may be supplied to the opposite ends of the cylinders 30 to effect opposite movement of the pistons 29, thereby to move the frame sections 15, 17 and 22 from the position shown in Fig. 4 back to their initial position shown in Fig. 3. The universal pivotal spring mounting for the front axle housing 59 enables the truck to move over an uneven mine floor without substantial tilting of the truck body, consequently preventing distortion of the frame parts.

As a result of this invention, it will be noted that an improved material transport truck is provided having improved material discharge means whereby the material may be discharged from the truck compartments without tilting of the truck body as a whole or increasing the overall height of the truck, a feature of considerable importance when the truck is operating in a mine having relatively low head room. It will further be noted that by the provision of the truck wheels provided with pneumatic rubber tires engageable directly with the mine floor, the improved truck may operate without the use of a mine trackway, thereby increasing freedom of movement of the truck while at the same time the cost of laying tracks throughout the mine is eliminated. It will further be evident that by the provision of the improved wheel driving means, including the independently operable wheel driving motors, the motor control means and the axle housing brakes, the truck may be propelled about the mine and steered about the relatively sharply curved mine passages in an improved manner. Other uses and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A material transport truck comprising, in combination, a portable truck body adapted to receive a material to be transported, said body comprising side walls, end walls and a bottom, said side walls being pivotally mounted, one to swing inwardly and the other to swing outwardly, a bottom plate section overlying said body bottom and pivotally connected at one end to said inwardly swingable side wall and at its other end to said outwardly swingable side wall, and power-operated means connected to said inwardly swinging wall for swinging said walls about their pivots and for inclining said bottom plate section relative to the body bottom to provide a side opening and to effect discharge of material through the open side of the truck body.

2. A material transport truck comprising, in combination, a portable truck body adapted to receive a material to be transported, said body comprising side walls, end walls and a bottom, said side walls being pivotally mounted, one to swing inwardly and the other to swing outwardly, a bottom plate section overlying said body bottom and pivotally connected at one end to said inwardly swingable side wall, links pivotally connecting the opposite end of said bottom plate section to said outwardly swingable wall, and power-operated means connected to said inwardly swinging wall for swinging said walls about their pivots and for inclining said bottom plate section relative to the body bottom to provide a side opening and to effect discharge of material through the open side of the truck body.

3. A material transport truck comprising, in combination, a portable truck body adapted to receive a material to be transported, said body comprising side walls, end walls and a bottom, said side walls being pivotally mounted at their upper edges, one to swing inwardly and the other to swing outwardly, a bottom plate section pivotally connected at one end to the bottom edge of said inwardly swingable side wall and at its other end to the bottom edge of said outwardly swingable side wall, and power-operated means connected to said inwardly swingable wall near the bottom edge thereof for swinging said side walls about their pivots and for inclining said bottom plate section relative to the body bottom to provide a side opening and to effect discharge of the material through the open side of the truck body.

4. A material transport truck comprising, in combination, a portable truck body adapted to contain a material to be transported and having pivotally mounted side walls, one side wall swingable inwardly and the other side wall swingable outwardly, swinging of one of said side walls providing a side opening on said truck, and means including said swingable side walls for discharging the material laterally through the open side of the truck without tilting the truck body as a whole, said material-discharging means including power operated means operatively connected to one of said side walls for effecting swinging of both of said side walls.

5. A material transport truck comprising, in combination, a portable truck body adapted to contain a material to be transported and having pivotally mounted side walls, one side wall swingable inwardly and the other side wall swingable outwardly, swinging of one of said side walls providing a side opening on said truck, and means including said swingable side walls for discharging the material laterally through the open side of the truck without tilting the truck body as a whole, said material-discharging-means including a fluid-actuated cylinder and piston device connected to one of said side walls for swinging both of said side walls about their pivots.

6. A material transport truck comprising, in combination, a portable truck body adapted to contain a material to be transported and having pivotally mounted side walls, one side wall swingable inwardly and the other side wall swingable outwardly and swinging of one side wall providing a side opening upon said truck, and a bottom plate section pivotally connected to said side walls, and means including said swingable side walls and said bottom frame section for discharging the material laterally from the open side of the truck without tilting the truck body as a whole, swinging of one of said side walls effecting tilting of said bottom plate section and movement of said bottom plate section during tilting thereof effecting swinging of said other side wall.

7. A material transport truck comprising, in combination, a portable truck body adapted to contain a material to be transported and having an outwardly swingable wall section and a bottom plate section pivotally connected to said wall section, said bottom plate section being operatively pivotally connected to said outwardly swingable wall section at the edge thereof nearest said wall section, and means including said wall and bottom plate sections for effecting lateral discharge of the material through one side of the truck while the truck body remains at a fixed height.

8. A material transport truck comprising, in combination, a portable truck body adapted to receive a material to be transported, said body having side walls, end walls and a bottom, said side walls being pivotally mounted, one to swing inwardly and the other to swing outwardly, the latter to provide an open side, and said bottom being tiltable in a vertical direction and hinged to said inwardly swingable side wall so that swinging of the latter effects tilting of said bottom, and means operatively connected to one of said side walls for swinging said walls and tilting said bottom to effect discharge of the material from the truck body through the open side thereof.

9. A material transport truck comprising, in combination, a portable truck body adapted to receive a material to be transported, said body having side walls, end walls and a bottom, said side walls being pivotally mounted, one to swing inwardly and the other to swing outwardly, the latter to provide an open side, and said bottom being tiltable in a vertical direction and hinged to both of said swingable side walls so that swinging of one of said side walls effects tilting of said bottom and swinging of said other side wall, and means operatively connected to one of said side walls for swinging said walls and tilting said bottom to effect discharge of the material from the truck body through the open side thereof.

10. A material transport truck comprising, in combination, a portable truck body adapted to receive a material to be transported, said body having side walls, end walls and a bottom, said side walls being pivotally mounted, one to swing inwardly and the other to swing outwardly, the latter to provide an open side, and said bottom being tiltable in a vertical direction and hinged to said inwardly swingable side wall, and means for swinging said walls and tilting said bottom to effect discharge of the material from the truck body through the open side thereof, said means including extensible power operated means connected between the top of the truck body at one side thereof and one of said swingable side walls near the bottom of the latter.

11. A material transport truck comprising, in combination, a portable truck body adapted to receive a material to be transported, said body having side walls, end walls and a bottom, said side walls being pivotally mounted, one to swing inwardly and the other to swing outwardly, the latter to provide an open side, and said bottom being tiltable in a vertical direction and hinged to said inwardly swingable side wall, and means for swinging said walls and tilting said bottom to effect discharge of the material from the truck body through the open side thereof, said means including extensible power operated means connected between the top of the truck body at one side thereof and the inwardly swingable one of said side walls near the bottom of the latter.

12. A material transport truck comprising, in combination, a portable truck body adapted to receive a material to be transported, said body having a pivoted side wall and a tiltable bottom, said side wall and said bottom being hinged together, and means including said pivoted side wall and said tiltable bottom for discharging the material laterally from the truck body through one side thereof, said side wall and bottom cooperating upon swinging thereof to provide an inclined surface over which the material slides by gravity to discharge through the side of the truck, said material-discharging means also including power operated means operatively connected to said side wall for swinging the latter and for tilting said bottom.

13. A material transport truck comprising, in combination, a portable truck body adapted to receive a material to be transported, said body having pivoted side walls and a tiltable bottom, said bottom being hinged to one of said side walls and the other side wall being swingable outwardly to provide an open side for the truck, and means for discharging the material laterally from the truck through the open side thereof including said pivoted side walls and said tiltable bottom and power operated means operatively connected to one of said side walls for swinging said side walls and tilting said bottom, said hinged side wall and bottom cooperating upon swinging thereof to provide an inclined surface over which the material slides by gravity to discharge through the open side of the truck and the other side wall swinging outwardly to permit sliding of the material along said inclined surface from the truck.

14. A material transport truck comprising, in combination, a truck body adapted to receive a material to be transported, said body having a tiltable bottom and a pivoted side wall, means for operatively connecting the edge of said bottom nearest to said side wall to the latter so that movement of said bottom during tilting thereof effects outward swinging of said side wall, and means for effecting tilting of said bottom and swinging of said side wall to effect discharge of the material from the truck body laterally through the side of the truck, said bottom as it tilts effecting discharge of the material by gravity and said pivoted side wall swinging outwardly to provide a side opening for the truck body.

JOSEPH F. JOY.